No. 668,179. Patented Feb. 19, 1901.
J. L. HARVEY.
MACHINE FOR MAKING WAX MATCHES.
(Application filed June 24, 1899.)
(No Model.) 9 Sheets—Sheet 1.
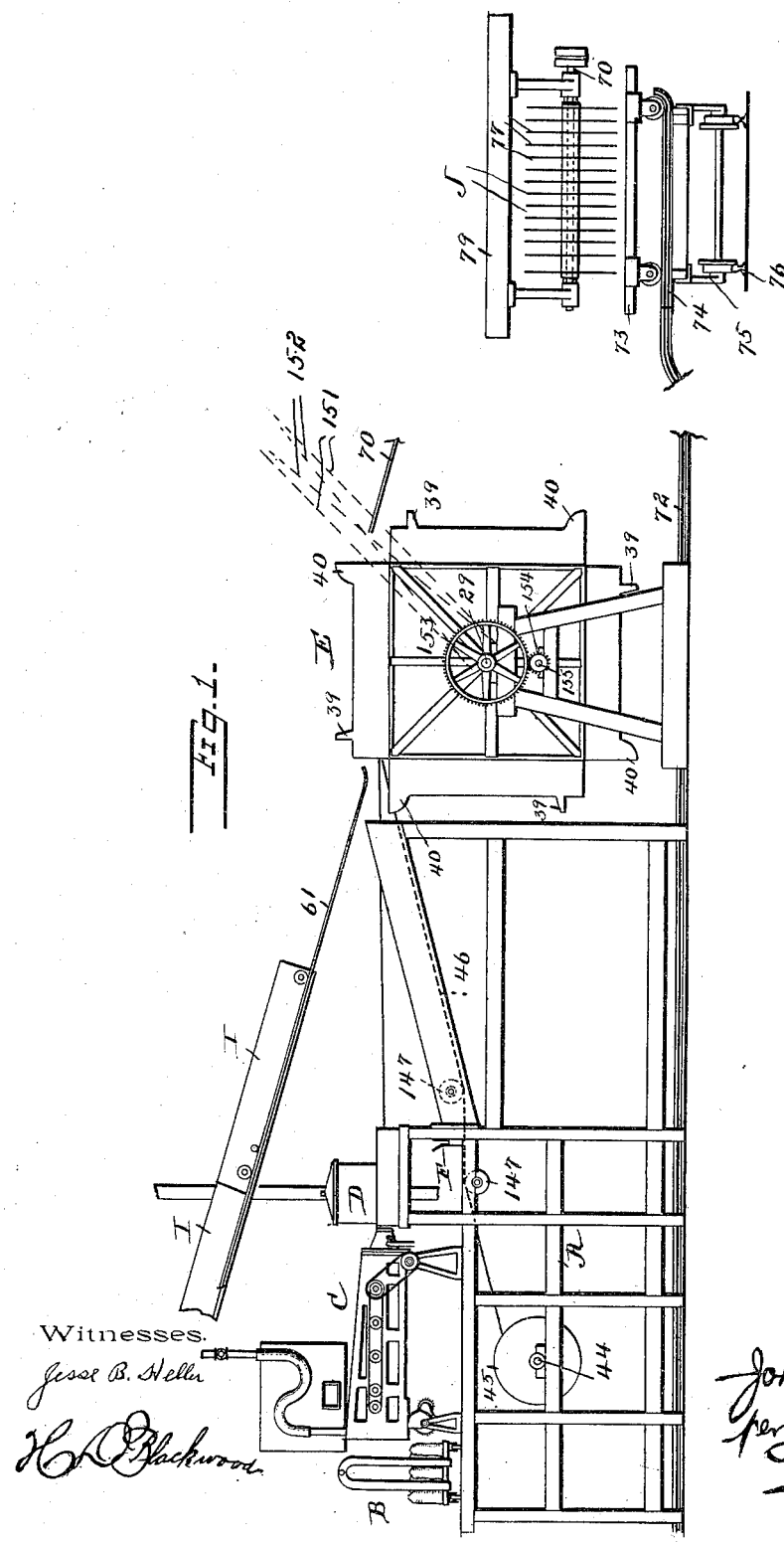
Witnesses.
Jesse B. Heller
H. D. Blackwood
Inventor:
John L. Harvey
per John R. Nolan
Attorney.

No. 668,179. Patented Feb. 19, 1901.
J. L. HARVEY.
MACHINE FOR MAKING WAX MATCHES.
(Application filed June 24, 1899.)
(No Model.) 9 Sheets—Sheet 2.
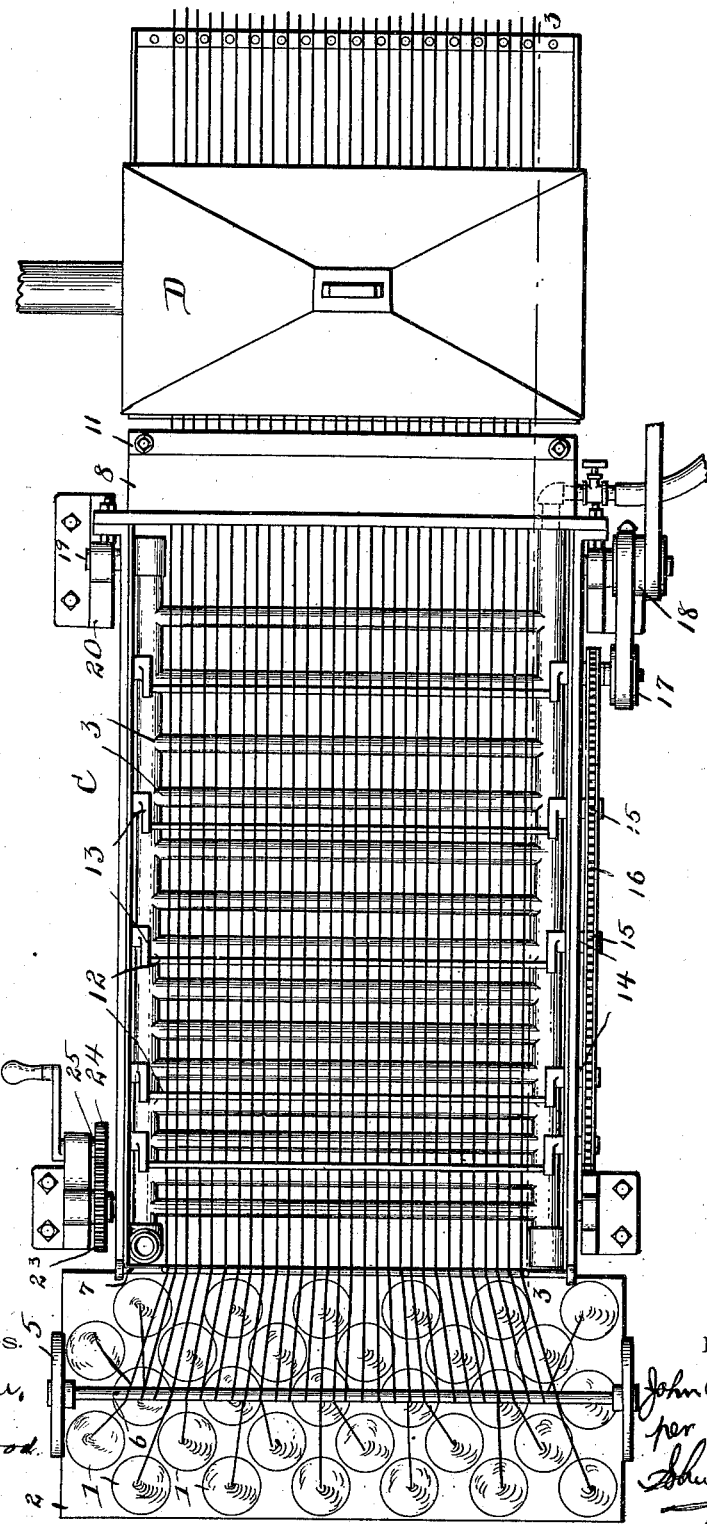

No. 668,179. Patented Feb. 19, 1901.
J. L. HARVEY.
MACHINE FOR MAKING WAX MATCHES.
(Application filed June 24, 1899.)
(No Model.) 9 Sheets—Sheet 3.
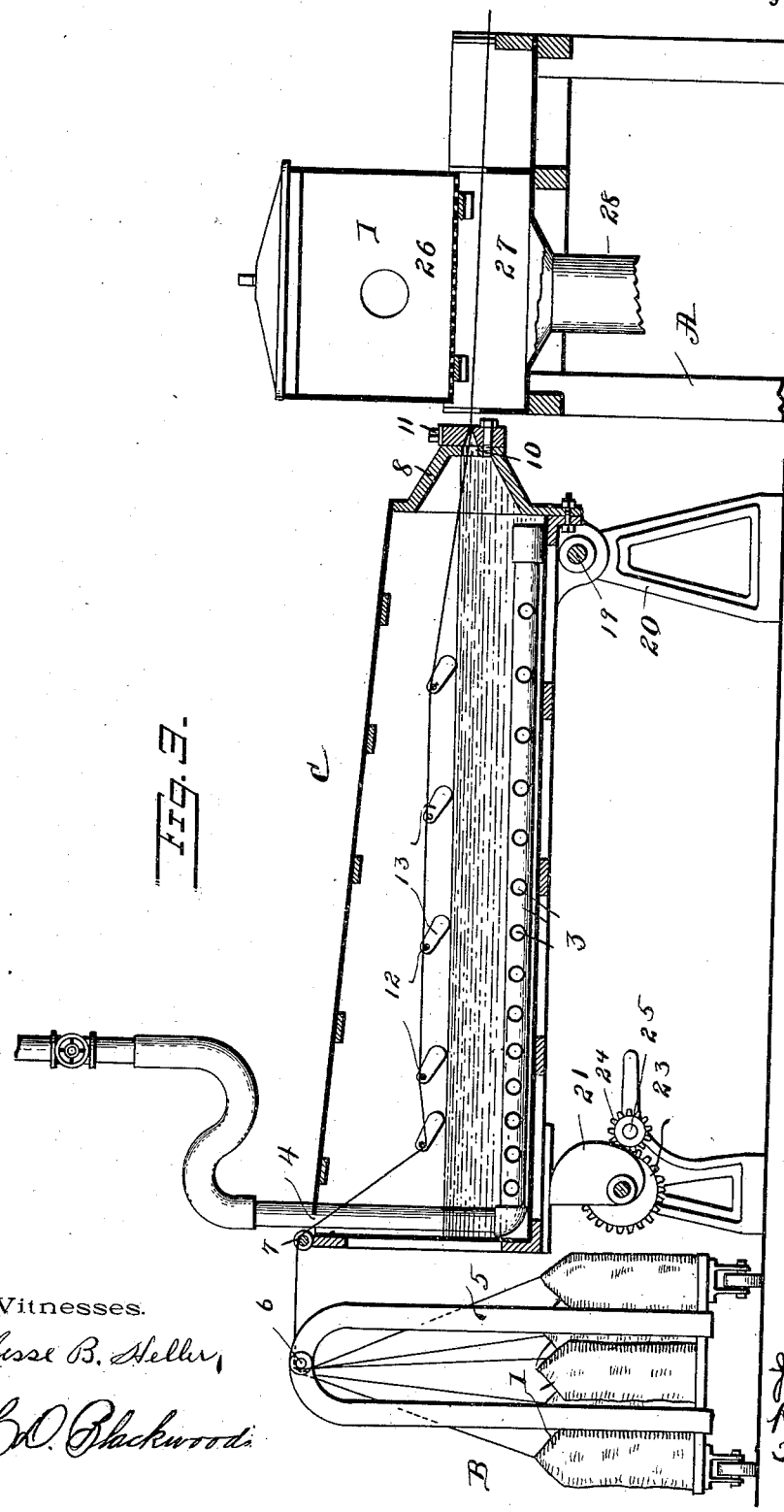
Witnesses.
Jesse B. Heller,
H. D. Blackwood.
Inventor.
John L. Harvey
for
John R. Nolan
Attorney.

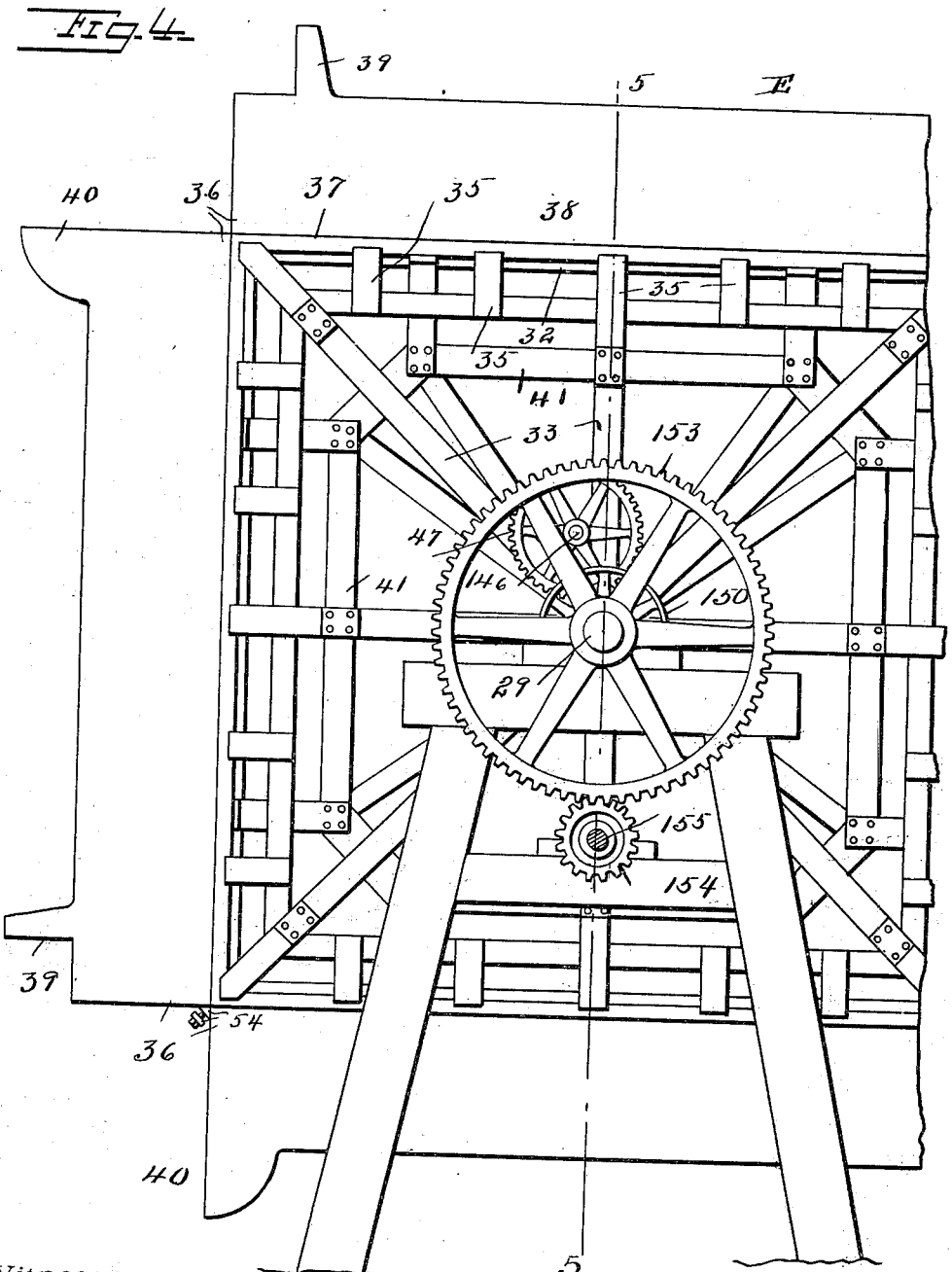

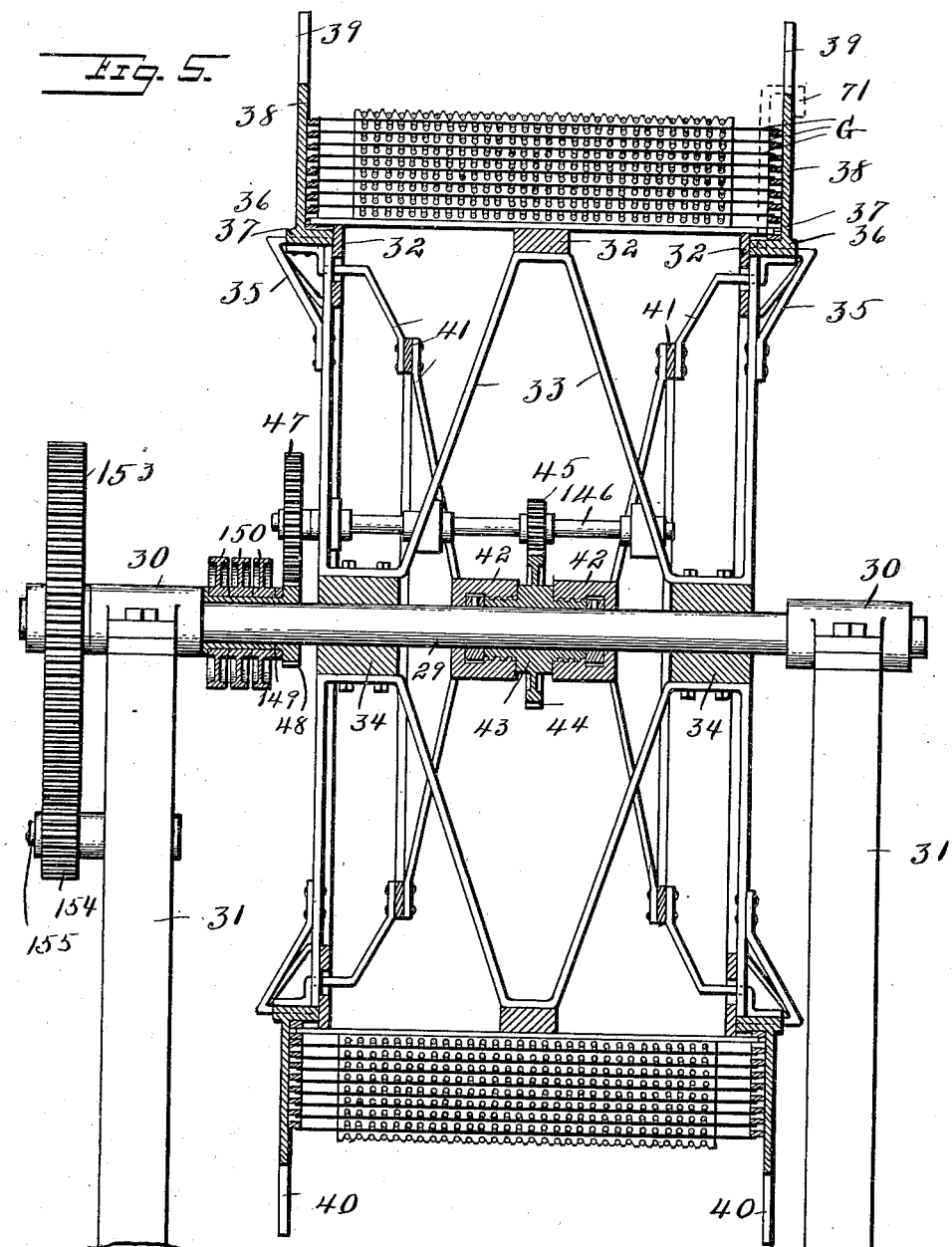

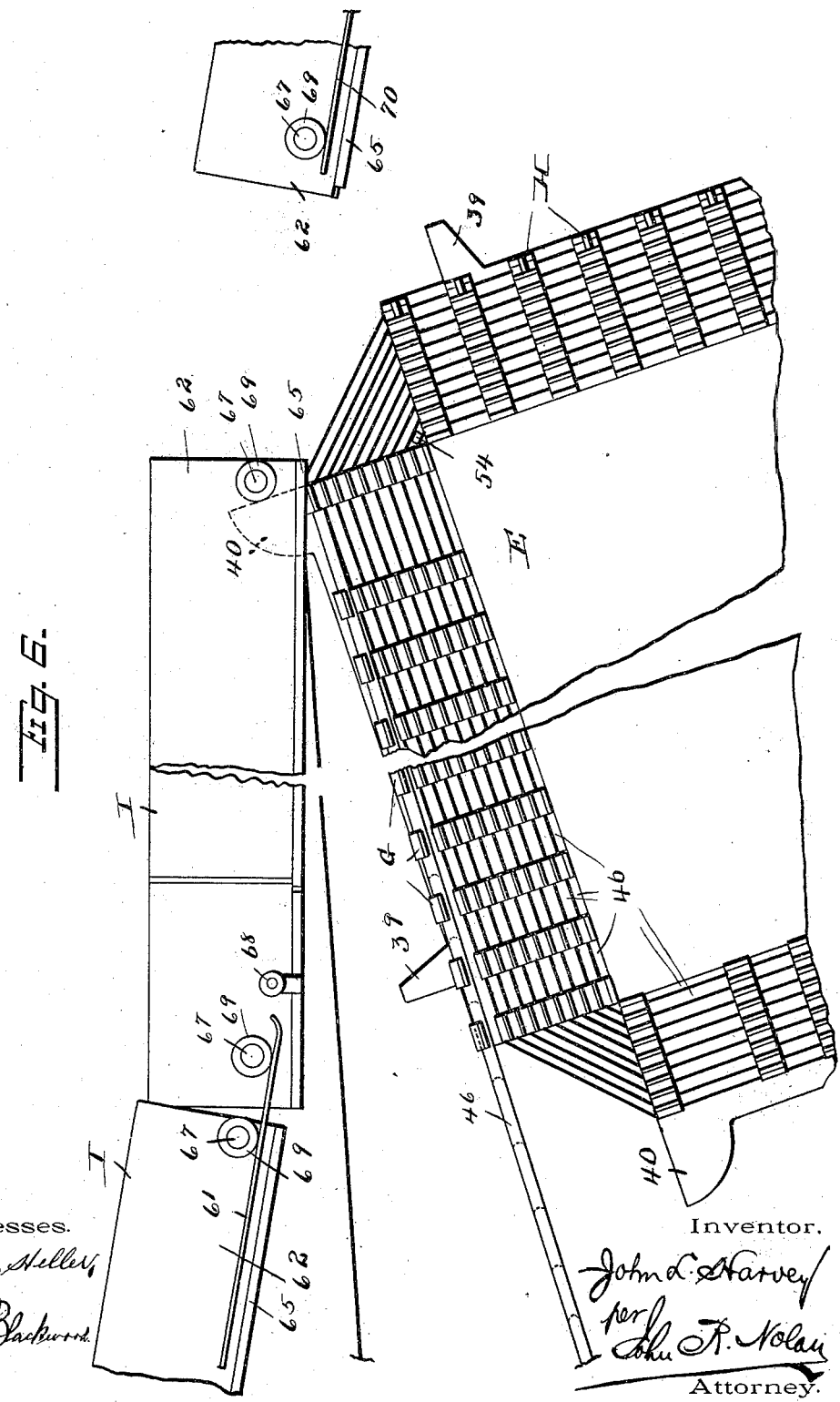

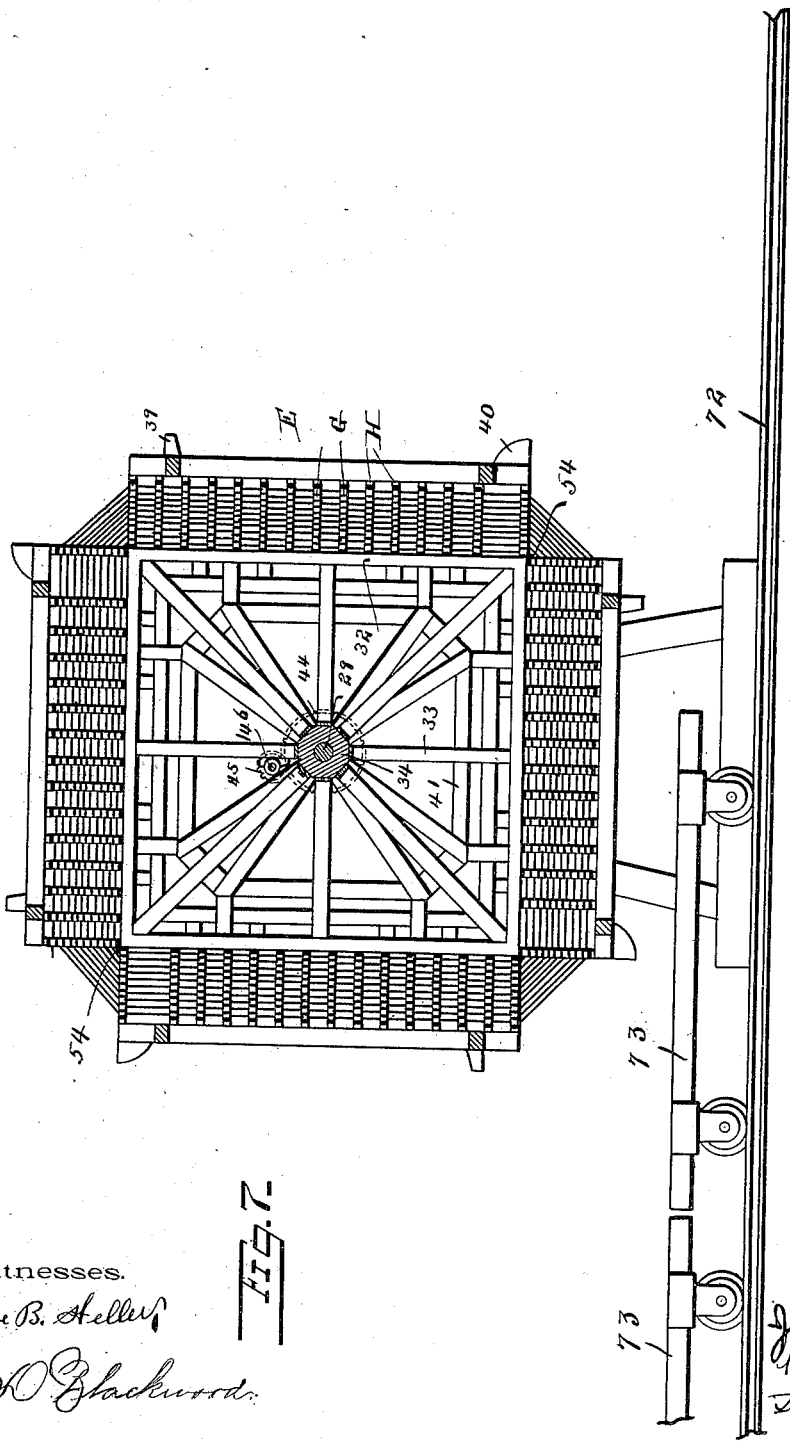

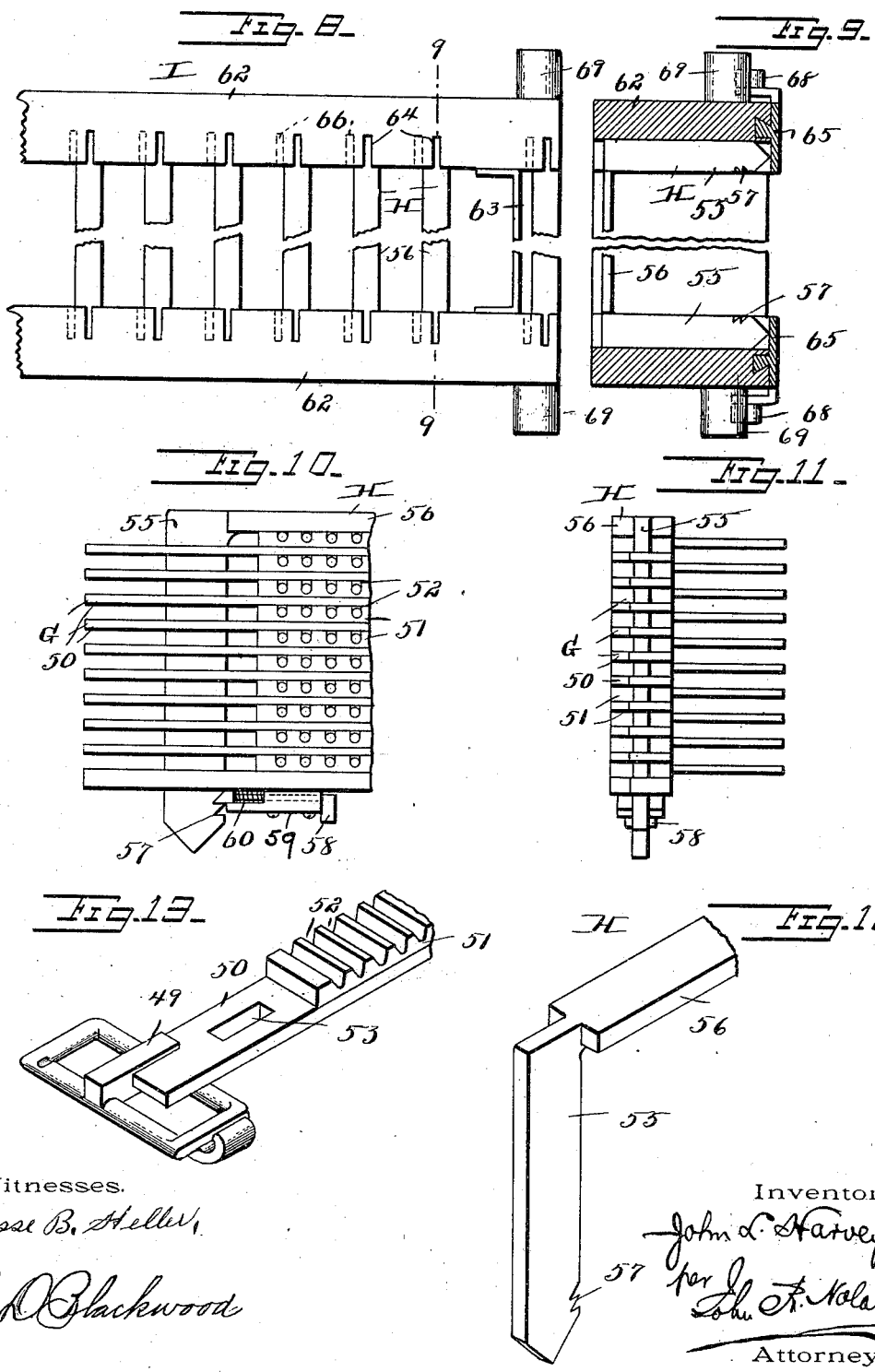

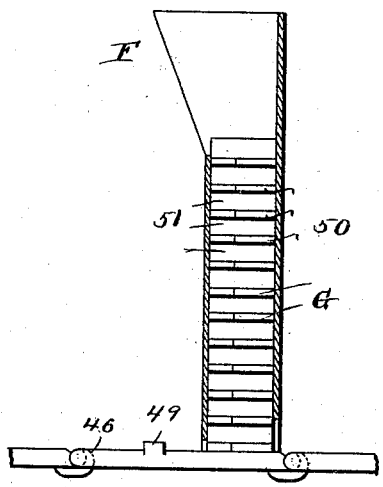
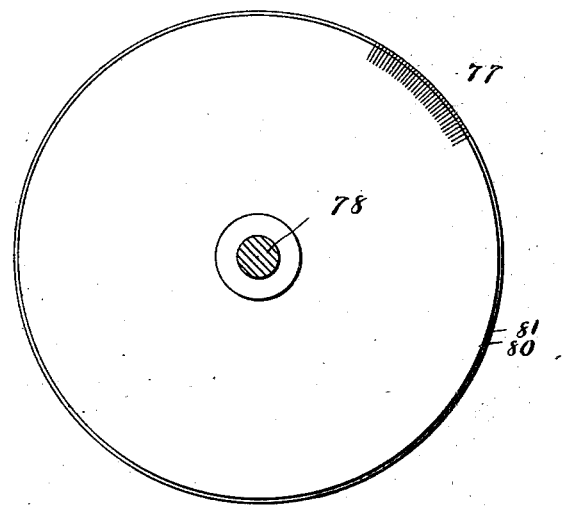
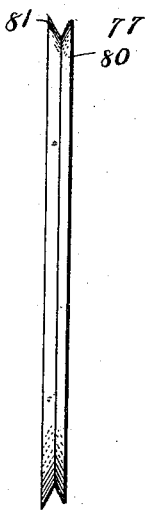

UNITED STATES PATENT OFFICE.

JOHN L. HARVEY, OF PHILADELPHIA, PENNSYLVANIA.

MACHINE FOR MAKING WAX MATCHES.

SPECIFICATION forming part of Letters Patent No. 668,179, dated February 19, 1901.

Application filed June 24, 1899. Serial No. 721,720. (No model.)

*To all whom it may concern:*

Be it known that I, JOHN L. HARVEY, a citizen of the United States, residing in the city and county of Philadelphia and State of Pennsylvania, have invented certain new and useful Improvements in Machines for Making Wax Matches, of which the following is a full, clear, and exact description, reference being had to the accompanying drawings, forming a part of this specification.

This invention relates to machines for making wax matches, and, as generally stated, comprehends a novel construction and organization of mechanism whereby threads are immersed in a composition-bath and effectually coated thereby to constitute "wax-taper" material of a uniform diameter, means whereby the said material is cooled and hardened, means whereby it is reeled up as rapidly as it is produced and the several strips or lengths at the same time introduced to racks, and thereby uniformly spaced and separated in vertical and horizontal rows, means whereby the racks, with the interposed material, are clamped together upon the reel, means whereby the parts thus clamped may be freed from the reel and transported therefrom to a cutting apparatus, whereby the said rows of material may be severed into match lengths or sections and be maintained by the racks in predetermined groups, to the end that said lengths or sections may be conveniently and expeditiously handled in the operation of heading the same with ignitible composition, all of which will be hereinafter particularly described and claimed.

In the drawings, Figure 1 is a side elevation of the apparatus. Fig. 2 is a plan of the thread-supplying devices and the composition and cooling-tanks. Fig. 3 is a longitudinal vertical section, as on the line 3 3 of Fig. 2. Fig. 4 is a side elevation of a portion of the reel and adjuncts. Fig. 5 is a transverse vertical section thereof, showing the racks and taper material thereon. Fig. 6 is a detail of the reel and the overlying trackway, the former being represented as fully supplied with the racks and taper material and about to receive one of the clamp-carrying frames delivered from said trackway. Fig. 7 is a vertical section through the said reel with the several rows of racks clamped thereon, showing the underlying off-bearing trucks upon which said racks are adapted to be deposited. Fig. 8 is a plan of a portion of one of the rack-carrying frames. Fig. 9 is a transverse section thereof, as on the line 9 9 of Fig. 8. Fig. 10 is an elevation of one end of a row of racks, showing a series of match-strips clamped therein. Fig. 11 is a plan of the same. Fig. 12 is a perspective view of one end of a clamp. Fig. 13 is a similar view of a portion of a rack and a chain-link engaged therewith. Fig. 14 is a vertical section through the hopper for supplying the racks to the chain conveyers, a portion of the latter being shown. Fig. 15 is an elevation of one of the circular cutters. Fig. 16 is an edge view thereof.

A is a substantial supporting-frame, B a source of thread-supply thereon, and C a horizontally-disposed tank or casing arranged in advance of the latter and adapted to contain the melted paraffin or other composition by which the threads are to be coated. In the present instance these threads are drawn from a series of cops or bobbins 1, which are mounted on a suitable truck 2. The casing is provided with a series of pipes 3, through which steam is circulated for the purpose of insuring the proper consistency of the composition. The rearward end of this casing is provided at its upper portion with a transverse opening 4, through which the threads are drawn into and longitudinally of the casing, the support 2 for the cops being provided with an arch 5, carrying an anifriction-roller 6, over which and a similar roller 7, adjacent to the opening, the threads are directed. At the forward end of the casing is a tapering head 8, provided with a horizontal opening 10, leading to a perforated die-plate 11, through which the coated threads are drawn and a uniform diameter imparted thereto. This die-plate is bolted on the end of the casing, so as to be readily detachable therefrom, as occasion may require.

Within the casing is arranged a series of transverse wires or rods 12, upon which the threads are drawn and by which they are alternately dipped into and raised from the composition-bath in a manner to insure the effectural coating of the threads. In the present instance the extremities of these wires are affixed to cranks 13, the studs 14 of which are journaled in the side walls of the casing. The studs in one of the walls are extended therethrough and are provided on their outer extremities with pinions 15, with the teeth of which is engaged an endless sprocket-chain 16, whereby when one of the pinions is rotated the entire series of cranks will be revolved, the wires or rods in their rotation thus dipping into and rising from the composition and permitting the threads to rise and fall accordingly. It will be observed that the threads pass under that wire at the rearward end of the casing and over the remaining wires, that the die-openings at the forward end of the casing are below the level of the composition, and that in consequence when the threads are drawn through said openings the rising and falling of the threads is insured.

One of the crank-studs is provided with a pulley 17, that is belted with an adjacent pulley 18, driven from a suitable source of power, thus effecting the described concerted operation of the train of pinions.

In order that the rearward end of the casing may be readily lowered to permit the composition to flow below the level of the die-openings—as, for instance, during the recharging of the casing or for the removal or the replacement of the die or for any other desired purpose—the forward end of the casing is pivoted, as at 19, upon standards 20, and the rearward end thereof is supported upon a cam 21, the shaft of which is journaled in suitable standards 22. This shaft is provided at one end with a spur-wheel 23, with which engages a pinion 24 on an adjacent crank-shaft 25, by the manipulation of which the cam may be turned more or less to effect the adjustment of the casing.

Immediately in front of the casing is arranged a cooling-tank D, below which pass the waxed threads as they are drawn through the dies, the plastic coating thus being cooled and hardened. This tank is provided with a perforated bottom 26 and is supported upon the framework A. It may be supplied with ice through which a current of air is blown and cooled, or air previously cooled may be blown into the empty tank, the perforated bottom thereof breaking up the current and distributing it upon and throughout the underlying coated material. Below the tank is a drip-pan 27, provided with a pipe 28, leading to a suitable point of discharge.

Located in advance of the cooling-tank is a skeleton reel E of peculiar construction upon which the coated material is wound in parallel rows as rapidly as it is produced, provisions being had whereby "rack-bars," as they may be termed, are delivered to the reel in succeeding rows and the material supplied thereto, whereby each series of bars and the imposed tapers are clamped together when the winding operation has been completed, and whereby the bars and material thus clamped together are released from the reel. Referring in this connection more especially to Figs. 4 to 7, both inclusive, of the drawings, 29 is a horizontal shaft having its bearings in boxes 30 on a suitable framework 31. Mounted on this shaft is the body of the reel, the same being square in cross-section or substantially so, as seen. Thus the reel has four plane faces, each of which comprises a series of bars 32, sustained by brace-rods 33, which are affixed to hubs 34, fast on the shaft 29. The outer bars of each face are provided with guide-brackets 35, to which are fitted laterally-movable carriages 36, whose function will hereinafter appear. These carriages each comprise a base-bar 37 and a side bar 38, the latter being provided at or near its ends with lugs 39 40, respectively, one of which, 39, has an inclined or beveled edge, as seen. The carriages upon each side of the reel are connected fixedly together by means of a skeleton frame 41, which is in turn connected with a nut 42 on a screw-threaded sleeve 43 on the shaft 29. This sleeve is oppositely threaded at its respective ends for the reception of the correspondingly-threaded nuts, whereby when the sleeve, which is loosely mounted on the shaft, is rotated both nuts and their respective connections, including the carriages, are moved horizontally toward and from each other. The sleeve constitutes, in effect, the hub of a spur-gear 44, with which engages a pinion 45, the shaft 146 of which has its bearings in boxes on brace-rods 33 of the reel. One end of this shaft extends beyond the side of the reel and carries a gear 47, which engages with a pinion 48 on a sleeve 149, loosely mounted on the reel-shaft. On this sleeve are three pulleys 150, the two outer pulleys being loose and the middle pulley fast. Upon the outer pulleys run two belts 151 152, respectively, one being straight and the other crossed, to the end that if one or the other belt be shifted upon the fast pulley the sleeve will be turned in either direction desired, and thus through the intermediate gearing the sleeve will be turned accordingly for the purpose of moving the carriages outward or inward.

On one end of the shaft 29 is a spur-wheel 153, with which coacts a pinion 154 on a lower stud-shaft 155, which may be driven from a suitable source of power to effect the bodily rotation of the reel. From the foregoing it will be seen that when both belts are on the loose pulleys the gear-sleeve 43 and its nuts will turn as a unit, and thus obviate any liability of lateral movement of the carriages.

Journaled in suitable bearings in the frame A is a shaft 44ª, upon which are mounted two suitably-separated reels 45ª, carrying each a chain 46 of peculiar construction. The free ends of the chains are adapted to be hooked or otherwise detachably secured to the baseboards, respectively, of a pair of opposite carriages when the latter are in their innermost position, to the end that if the reel E be rotated the chains will be wound upon the inner sides of said carriages. The chains on their way to the reel are guided below a transversely-disposed hopper F by means of suitably-located rollers 147. In this hopper are contained a pile of rack-bars G, which are delivered one by one to the chains and conveyed upward thereby to the reel. In the present instance the bottom of the hopper opens directly upon the chains, and the links of the latter are provided on their upper faces with ribs or projections 49, which as the chains progress abut against the opposing ends of the lowermost racks and carry them upward in succession. Each of these racks comprises a slat or bar 50, having on its upper side a strip of rubber 51 or other yielding material whose upper face is provided with a series of transverse grooves 52, preferably with flaring mouths, arranged at equal distances apart. The grooved strip does not extend the entire length of the slat or bar, and the uncovered end portions of the latter are provided with slots 53 for the reception of certain clamp devices hereinafter described.

Before the ends of the chains are connected with the carriages on the reel, as above stated, they are drawn below the hopper and a number of the racks thus carried upward thereby and supported across the upper horizontal face of the reel. The free ends of the coated threads are then clamped along one corner of the reel E by means of a bar 54, so as to enter the grooves of the initial series of racks upon the reel. This being done the reel is revolved, the chain, racks, and coated threads or tapers thus being wound thereon, the racks being sustained at equal distances apart upon the chains and being imposed one upon the other in the succeeding revolutions, and the tapers being embedded in the grooves of the contiguous racks, so as to be held thereby in uniform horizontal and vertical rows.

It will be seen that the coated threads as they are wound upon the racks tie the latter in place and serve, in conjunction with the chain, to prevent their displacement. During the final revolution of the reel a series of clamping-yokes H is delivered thereto and automatically connected with the respective rows of rack-bars, so as to effectually lock the latter and the taper material together. These yokes comprise vertical limbs 55, connected at their upper ends by a cross-bar 56 and pointed or beveled at their lower extremities. They are provided on their lower inner edges with a series of ratchet-teeth 57, with which spring-actuated bolts 58 on the lowermost rack-bars are adapted to be engaged when the yokes are applied to the series of rack-bars. These bolts are fitted in suitably-arranged guides 59 on the under sides of the first row of racks applied to the reel and are held normally projected in position to engage the teeth of the yoke-clamps by coiled springs 60, disposed in the guides.

The mechanism for delivering and applying the clamps to the racks is of the following construction: 61 is an inclined chute or trackway leading adjacent to the path traversed by the upper forward portion of the reel, and I is a series of frames adapted to be arranged end to end upon said trackway and to be delivered thereby in succession upon the respective faces of the reel during the final revolution of the latter. Each of these frames comprises a pair of parallel rails 62, maintained a suitable distance apart by means of cross-bars 63. On the inner edges of the rails are vertical guideways 64, to which are fitted the vertical members of the yoke-clamps, which are spaced apart or separated correspondingly with the rows of racks on the reel. The lower ends of these clamps are temporarily supported upon longitudinally-disposed slide-bars 65, which are fitted to the lower edges of the respective rails. In the present instance the bars and rails are connected by interlocking dovetailed tongues and grooves, as seen. The bars are provided with vertical slots 66, which are spaced correspondingly with the guideways in the rails. Normally the slots are out of line with said guideways; but when the bars are shifted to move their slots into register with the guideways the yoke-clamps, being unsupported by the bars, drop through said slots by gravity, as will be hereinafter described. On the outer edge of the bars, near the rearward ends thereof, are lugs 67, carrying laterally-projecting rollers 68, and on the outer sides of the rails, near the respective ends thereof, are antifriction-rollers 69. The rollers 68 and 69 are so disposed in respect to each other and to the lugs 39 40 on the frames that in the final revolution of the reel as the frames are directed thereto the lugs on the advancing uppermost carriages on the reel coacts with the opposing rollers 69 and draw the frame forward therewith, the rearward rollers riding upon the trackway until they escape the end thereof, whereupon the frame drops bodily upon the underlying row of racks on the reel. As the frame descends the adjacent rollers 68 69 on the respective sides of the frame embrace the underlying lugs 39, and the beveled edges of the latter perforce advance the bars independently of the side rails and bring the slots in said bars in registry with the vertical limits of the yoke-clamps, as above indicated. These limbs thus penetrate the slots in the vertical rows of racks, and the teeth thereof are automatically engaged by the spring-bolts on the lowermost racks. Hence each vertical row of rack-bars, with the interposed taper material, is effectually clamped. As the rotation of the reel continues the succeeding frames I are likewise fed to the advancing faces of the reel and the respective rows of rack-bars correspondingly locked together.

The frames I, minus the clamps, are removed by an attendant and equipped with other clamps for a succeeding operation. An off-bearing trackway 70 for the empty frames may be used. The respective racks having been clamped as just described, the operation of the reel is arrested, and the row of tapers being delivered from the casing to the reel is cut off on a line adjacent to the latter. This being done, the belt 51 is shifted onto the fast pulley on the sleeve 48, thus effecting the rotation of said sleeve and, through the intermediate gearing and connections, moving the carriages laterally outward, such carriages perforce withdrawing the chains from the ends of the racks. In order still more effectually to insure the withdrawal of the chains, I preferably provide hooks 71, which preparatory to the outward adjustment of the carriages are applied thereto, so as to take against the inner edges of the chains. (See Fig. 5.)

Arranged below the reel E is a trackway 72, upon which is run a train of trucks 73. When the chains have been shifted as just stated, one of these trucks is run below the reel, and the attendant by means of a suitable knife severs the entire body of taper material along that corner of that reel where the ends of the threads are clamped by the bar 54. The freed end of the bottom series of racks and tapers thus drops upon the underlying truck. The operator then gradually turns the reel and at the same time advances the trucks thereunder, and in consequence the several series of racks and tapers drop upon the trucks in succession. The train of trucks is then moved adjacent to a gang of rapidly-revolving circular cutters J and the groups of racks cut apart, so as to leave one group upon each truck. The trucks are then run successively below the cutters and the taper material thereon divided on lines at or adjacent to one edge of each vertical row of racks. There is thus held by each row of racks a series of match lengths the free ends of which may be readily dipped in ignitible composition. In the present instance each of the trucks containing the material to be cut is run upon a trackway 74 on an underlying truck 75, which in turn traverses a cross-track 76 lying below the series of cutters, to the end that the first-named truck may be readily run below the cutters and thence transferred to a suitable dipping-room.

The cutters comprise a series of circular disks 77, mounted at suitable distances apart on a horizontal shaft 78, which has its bearings in a frame 79 and is driven from a suitable source of power. Each of the disks is provided with two peripheral cutting edges 80 81, respectively, one of which is of slightly-smaller diameter than the other. These cutters rotate adjacent to one side of each set of racks, the larger cutting edge first contacting with the taut taper material and severing the same with a clean cut and the smaller edge likewise shearing off the small lengths of material projecting beyond the sides of the racks.

I claim—

1. In a machine for making wax matches, the combination with a casing in which the coating composition is contained, of means for raising and lowering the rearward end of said casing, a source of thread-supply from which the threads are drawn through said casing, and a die or dies at the forward end of said casing for the passage of the coated threads.

2. In a machine for making wax matches, the combination with a casing in which the coating composition is contained, of a pivotal support for the forward end of said casing, a cam upon which the rearward end is supported, and means for bearing and operating said cam, a source of thread-supply from which the threads are drawn through said casing, and a die or dies at the forward end of said casing for the passage of the coated threads.

3. In a machine for making wax matches, the combination with a source of thread-supply, a casing in which the coating composition is contained and through which the threads are drawn, a die or dies at the forward end of said casing for the passage of the coated threads, a cooler therefor, means whereby the coated threads are disposed in succeeding parallel rows, means whereby rack-bars are interposed between succeeding rows, and means whereby the superposed rows of bars are clamped together.

4. In a machine for making wax matches, the combination with a source of thread-supply, a casing in which the coating composition is contained and through which the threads are drawn, a die at the forward end of said casing for the passage of the coated threads, a cooler therefor, a reel upon which said threads are wound, means for feeding rack-bars at intervals apart upon said reel during the winding of the threads thereon, and means for clamping together the superposed rack-bars between which the threads are clamped.

5. In a machine for making wax matches, the combination with a reel upon which the coated material is wound in parallel rows, of means for automatically feeding rack-bars at intervals apart upon said reel during the winding of the threads thereon, and means for locking together the superposed rack-bars between which the threads are clamped.

6. In a machine for making wax matches, the combination with a reel provided with laterally-movable carriages, means for moving said carriages toward and from each other, a source of taper-supply for said reel, a source of rack-bar supply therefor, flexible carriers adapted to be wound upon said carriages and to deliver thereto the rack-bars at intervals apart, and means for clamping together the superposed rack-bars and the taper material preparatory to their removal from the reel.

7. The combination with a source of taper-supply, of a reel to which the free ends of the tapers are secured, and means for supporting and rotating said reel, a pair of chains secured to said reel and provided with studs or projections at intervals apart, a hopper for supplying rack-bars successively to said chain whereby the bars are engaged at their ends by the studs or projections on the chains and carried upon the reel, means whereby the rows of rack-bars, with the interposed taper material, are clamped together, and means whereby the chains are removed from the ends of the rack-bars.

8. In a machine for making wax matches, the combination with a reel provided with laterally-movable carriages, means for moving said carriages toward and from each other, a source of taper-supply for said reel, a source of rack-bar supply therefor, flexible carriers adapted to be wound upon said carriages and to deliver thereto the rack-bars at intervals apart, and means for feeding and applying clamp-bars to the succeeding rows of superposed rack-bars.

9. In a machine for making wax matches, the combination with a reel provided with laterally-movable carriages, means for moving said carriages toward and from each other, a source of taper-supply for said reel, a source of rack-bar supply therefor, flexible carriers adapted to be wound upon said carriages and to deliver thereto the rack-bars at intervals apart, a series of frames carrying rack-clamping devices, means for feeding said frames upon the reel, and means for applying the clamping devices to the rows of superposed rack-bars.

10. In a machine for making wax matches, the combination with a support or carrier, means for supplying rack-bars thereto, and means for introducing rows of taper material between said rack-bars, of a frame provided with a series of detachable clamping devices for said rack-bars, and means whereby said devices are applied to and interlocked with said bars.

11. The described clamp-carrying frame comprising connected side rails, provided with vertical guideways, and slide-bars on the lower edges of said rails provided with slots or openings corresponding with said ways in combination, with the slotted rack-bars adapted to receive and hold rows of taper material, clamp devices mounted on said frame and adapted to be applied thereby to, and engaged with, the rack-bars, and locking means for the clamp devices.

12. The combination with a support or carrier, the end slotted rack-bars and the rows of taper material thereon, of the clamp-carrying frame comprising connected side rails with vertical guideways, and slide-bars provided with slots or openings corresponding with said ways; clamp devices fitted to said guideways, and supported by said slide-bars, and means whereby said bars are moved to bring the slots therein in registry with said guideways and permit the passage of the clamp devices through the underlying racks when the frame is applied thereto, and locking means on the lowermost rack-bars adapted to engage said clamp devices.

13. In a machine for making wax matches, the combination with a reel or carrier upon which rows of taper material and rack-bars are wound and clamped, of cutting mechanism, whereby the material clamped between the adjacent rows of bars is cut into lengths, after the said bars and material have been removed from the reel or carrier.

14. The combination with a series of rack-bars between which tapers are clamped, of a series of cutting-disks having each two peripheral cutting edges of different diameters.

In testimony whereof I have hereunto affixed my signature this 21st day of June, A. D. 1899.

JOHN L. HARVEY.

Witnesses:
JOHN R. NOLAN,
ANDREW V. GROUPE.